US008365178B2

(12) United States Patent
Laor et al.

(10) Patent No.: US 8,365,178 B2
(45) Date of Patent: Jan. 29, 2013

(54) PRIORITIZING SCHEDULING OF VIRTUAL MACHINES BY RECALCULATING PRIORITY NUMBERS FOR EACH VIRTUAL MACHINE BASED ON THE INTERACTION OF USERS WITH THE VIRTUAL MACHINES

(75) Inventors: Dor Laor, Tel Aviv (IL); Yaniv Kamay, Modi'in (IL)

(73) Assignee: Red Hat Israel, Ltd., Raanana (IL)

( * ) Notice: Subject to any disclaimer, the term of this patent is extended or adjusted under 35 U.S.C. 154(b) by 635 days.

(21) Appl. No.: 12/572,996

(22) Filed: Oct. 2, 2009

(65) Prior Publication Data

US 2011/0083132 A1    Apr. 7, 2011

(51) Int. Cl.
*G06F 9/46* (2006.01)
(52) U.S. Cl. ........................................ 718/103; 718/104
(58) Field of Classification Search .................. None
See application file for complete search history.

(56) References Cited

U.S. PATENT DOCUMENTS 5,465,354 A * 11/1995 Hirosawa et al. ............. 718/106
7,158,972 B2 * 1/2007 Marsland ............................... 1/1

* cited by examiner

*Primary Examiner* — Meng An
*Assistant Examiner* — Wissam Rashid
(74) *Attorney, Agent, or Firm* — Lowenstein Sandler PC

(57) ABSTRACT

A mechanism for prioritized scheduling of virtual machines is disclosed. A method includes receiving control of a virtual machine (VM) managed by a virtual machine monitor (VMM) on a host machine and executing a prioritization task involving a hardware emulation of the VM, determining an interactivity statistic for the VM based on a hardware type factor of the hardware emulation of the VM, calculating an interactivity rate for the VM based on the determined interactivity statistic for the VM, sending the calculated interactivity rate to a management daemon if the calculated interactivity rate is different than a previous interactivity rate for the VM, re-calculating priority numbers for each of the VM and all other VMs managed by the VMM based on the calculated interactivity rate, and providing the re-calculated priority numbers to a scheduling algorithm of a scheduler of the host machine for the scheduler to utilize in prioritizing the VM process.

20 Claims, 4 Drawing Sheets

PRIORITIZING SCHEDULING OF VIRTUAL MACHINES BY RECALCULATING PRIORITY NUMBERS FOR EACH VIRTUAL MACHINE BASED ON THE INTERACTION OF USERS WITH THE VIRTUAL MACHINES

TECHNICAL FIELD

The embodiments of the invention relate generally to virtual machine systems and, more specifically, relate to a mechanism for prioritized scheduling of virtual machines.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Recently, solutions providing centralized hosting for VMs that run (virtual) desktops or that are virtual servers have been developed. Such solutions consist of centralized servers that are partitioned into multiple VMs that host the VMs, thereby providing a desktop for each user or providing a virtualized server. The centralized hosting provides the manageability of server-based computing, while the dedicated environment provides the flexibility and compatibility with applications that a desktop enables. In general, VMs therefore enable remote access to a host or server computer by a remote client computer, which mimics or reconstructs the events taking place on the host computer.

However, one problem that arises with such centralized hosting of VMs is the over-committal of CPU resources of the VM host machine. In virtualization, instead of a single desktop owning all of the hardware of the machine hosting it, many desktops now own and share the same hardware. Usually all desktops, whether or not they are virtualized, do not use the CPU at all times. In virtualization, each of the desktops (i.e., VM) are allocated a small amount of processing time with the CPU, resulting in an over-committal of CPU resources. While this small amount of processing time may support a Microsoft™ Office task without any problems, it is not enough for most resource-intensive tasks, such as a VM handling a multimedia file (e.g., performing playback of audio or video). When multiple VMs need the CPU, the VMs will notice a slow down in performance.

When a VM handles multimedia, such as audio, the multimedia is sensitive to CPU scheduling. For example, in order to play a fluent audio stream, the audio is typically played in frequent time intervals (e.g., every 10 ms). If a VM host machine over commits its CPU and there are many VMs running, then the other VMs may steal the physical CPU resources from the VM playing audio and it might not be able to play the audio in a consistent and smooth fashion. The result will be that an end user of the VM experiences an interruption in the audio stream.

Similarly, latency-sensitive tasks of an interactive user, such as those associated with the direct input of a user, including typing on a keyboard or using a mouse, would also benefit from fast availability processing resources for their VM. When an end user is directly interacting with the VM (such as typing, using a mouse, or providing some other type of input to the VM), they expect to see an immediate response to their input. Any lag or interruption in the direct interaction of the end user due to over-committed CPU resources of the VM host machine is quite noticeable to the end user. This is compared to latency-insensitive jobs, such as database jobs, where a lag or interruption is not highly noticeable to the end user.

As such, a solution for prioritizing scheduling of VMs to provide an end user of a VM smoother interaction and feedback with the VM would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
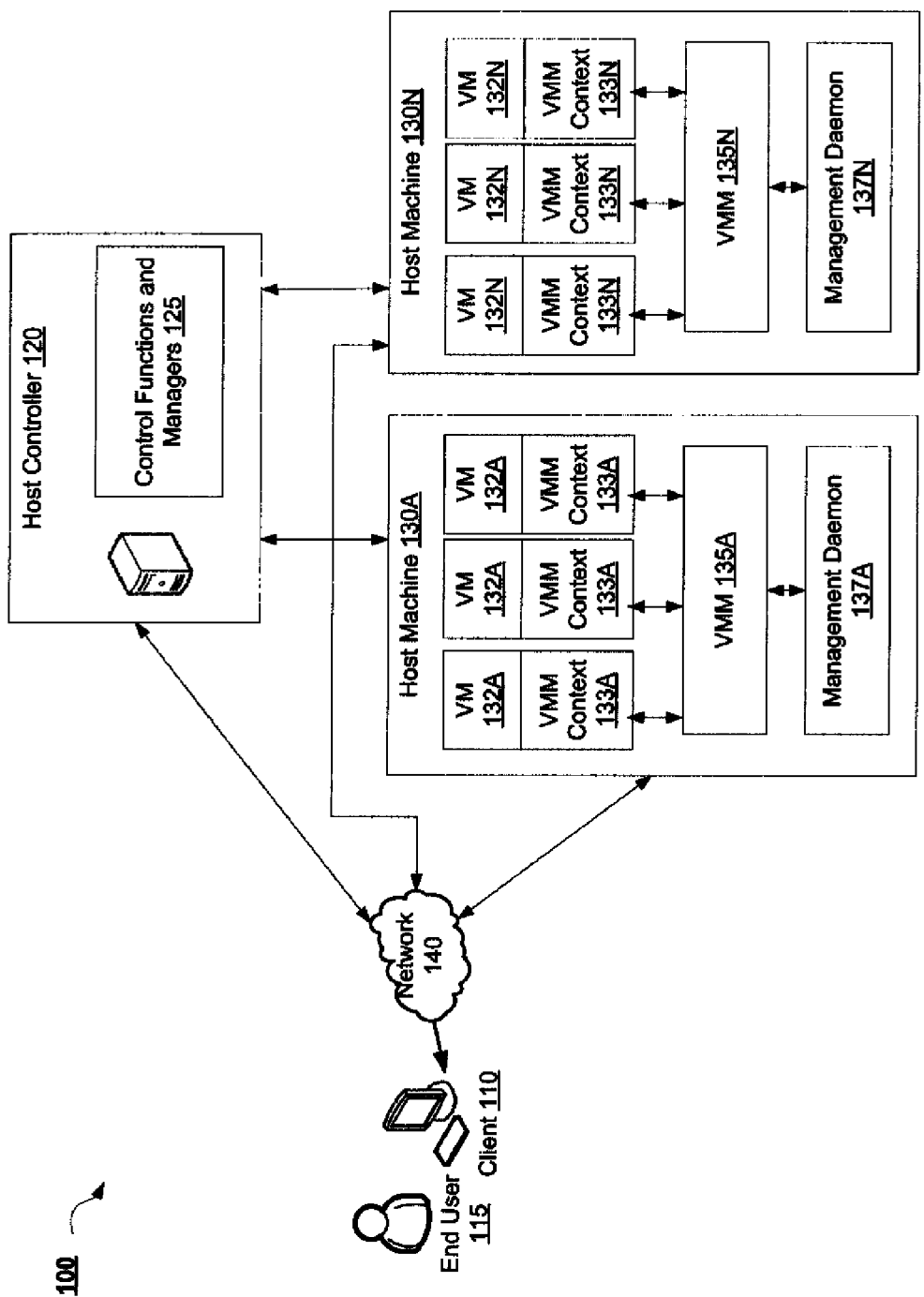
FIG. 1 is a block diagram of a virtual machine (VM) system for implementing prioritized scheduling of VMs according to embodiments of the invention.

Embodiments of the invention provide for a mechanism for prioritized scheduling of virtual machines. A method of embodiments of the invention includes receiving control of a virtual machine (VM) managed by a virtual machine monitor (VMM) on a host machine and that is executing a prioritization task involving a hardware emulation of the VM, determining an interactivity statistic for the VM based on a hardware type factor of the hardware emulation of the VM, calculating an interactivity rate for the VM based on the determined interactivity statistic for the VM, sending the calculated interactivity rate for the VM to a management daemon if the calculated interactivity rate for the VM is different than a previous interactivity rate for the VM, re-calculating priority numbers for each of the VM and all other VMs managed by the VMM based on the calculated interactivity rate for the VM, and providing the re-calculated priority numbers to a scheduling algorithm of a scheduler of the host machine for the scheduler to utilize in prioritizing the VM process.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for prioritized scheduling of virtual machines (VMs). Typically, a VM host machine runs several VMs without enabling any automatic prioritization of VMs in scheduling for use of the VM host machine's resources. Embodiments of the invention give different scheduling priority (e.g., higher priority in some cases) to VMs that are currently being directly utilized by end users (e.g., an end user is currently entering data, etc.) and/or playing back multimedia files to end users, as opposed to VMs performing background tasks without any end user interaction. As a result, the end user experiences smoother interaction and feedback with the VM with embodiments of the invention.

FIG. 1 is a block diagram of a VM system 100 for implementing prioritized scheduling of VMs according to embodiments of the invention. One skilled in the art will appreciate that other architectures for VM system 100 are possible, and the implementation of a VM system utilizing embodiment of the invention are not necessarily limited to the specific architecture depicted by FIG. 1.

VM system 100 includes a client terminal 110 used by an end user 115 connected via network 140 to one or more VM host machines 130A, 130N that are managed by a host controller 120. Each host machine 130A, 130N hosts one or more VMs 132A, 132N that each run on top of a software layer represented by a virtual machine monitor (VMM) 135A, 135N, which in turn runs directly on the hardware platform of each host machine 130A, 130N. VMM 135A, 135N virtualizes its host machine's 130A, 130N physical resources for each of the VMs 132A, 132N that are hosted by host machine 130A, 130N. VMM 135A, 135N may also be referred to as a hypervisor, a kernel-based hypervisor (e.g., Kernel-based VM (KVM)), or a host OS. In one embodiment, VMs 132A, 132N provide virtual desktops for end users 115. For every VM 132A, 132N managed by VMM 135A, there is an internally separate VMM context 133A, 133N running with that VM 132A, 132N

Host controller 120 may be any type of a computing device having a memory, a processor, and so on. Host controller 120 is coupled to the host machines 130A, 130N and contains all the control functions, including management of the overall VM environment, for the VM system 100. 120 includes control functions and managers 125 for management of the VM system 100. For example, control functions and managers 125 may provide for provisioning individual VMs and pools of VMs, high availability (HA) logic to handle host machine 130A, 130N and host controller 120 failures, image management control to manage VM images, and session management/connection brokers to establish connections between the end user 115 and the associated VM 132A, 132N.

Embodiments of the invention provide for prioritized scheduling of VMs 132A, 132N, in order to provide a smooth and seemingly uninterrupted VM experience to the end user 115 of a VM 132A, 132N. In one embodiment, prioritized scheduling of VMs occurs for any VMs executing tasks where end users will be sensitive to their interruption. For example, such tasks may include processes associated with a keyboard input or mouse input by the end user, or tasks associated with the playback of a multimedia file to the end user.

As previously described, VMs 132A, 132N share the hardware resources of the host machine 130A, 130N hosting them. Typically, only a few VMs 132A, 132N are performing latency-sensitive tasks at a given moment in time. Embodiments of the invention identify when prioritization tasks (i.e., tasks where an end user is sensitive to interruption) are being performed and which VM 132A, 132N is performing these prioritization tasks. Then, the VMs 132A, 132N performing these prioritization tasks are re-prioritized over the other VMs in terms of utilizing host machine 130A, 130N resources. Eventually, these tasks of the prioritized VMs are able to quickly complete and the end user notices less, or possibly no, interruption in their VM experience.

In order to accomplish the prioritization of VMs of embodiments of the invention, the VMM 135A, 135 N automatically identifies any VM tasks known to be a prioritization task and determines a VM interactivity rate for that VM task. The VM interactivity rate is then used by a scheduler (not shown) of the host machine to schedule a variable processing time slot for the task. Typically, VMs performing non-interactive task (in terms of the end user 115) will have longer and less frequent scheduling time slots, while VMs performing interactive tasks will have shorter and more frequent scheduling time slots as determined by the VM interactivity rate.

In embodiments of the invention, the VMM 135A, 135N is able to identify prioritization tasks performed by a VM 132A, 132N because each VM 132A, 132N is provided an emulation for each hardware component (e.g., modem, CPU, mouse, keyboard, audio card, etc.) used by the VM 132A, 132N. Any hardware required by a VM 132A, 132N, such as the audio devices, monitor, keyboard, and mouse, cannot be used or played without the hardware emulation.

Each VM 132A, 132N is implemented as a standard process in the host machine 130A, 130N. When a VM 132A, 132N utilizes its hardware emulations to perform a prioritization task, a CPU of the host machine 130A, 130N causes the execution context to switch from the VM 132A, 132N to the VMM 135A, 135N. This is known as a trap of the VM 132A, 132N.

Once a VM 132A, 132N is trapped (i.e., execution context switched to the VMM 135A, 135N), the VMM 135A, 135N can identify the prioritization task being performed by the VM 132A, 132N and also determine the interactivity rate for the VM 132A, 132N. In one embodiment, VMM 135A, 135N is programmed with information identifying which tasks that are to be prioritized and an interactivity statistic for the particular emulated hardware of the task. The VMM 135A, 135N recalculates the VM interactivity rate according to this known information and compares the new VM interactivity rate to a previous VM interactivity rate for the VM 135A, 135N.

If there is a change in the VM interactivity rate, the VMM 135A, 135N sends the new VM interactivity rate for the trapped VM process to a management daemon 137A, 137N. The management daemon 137A, 137N runs outside of the VM 132A, 132N and associated VMM 135A, 135N and is responsible for the creation of all VMs 132A, 132N. Accordingly, the management daemon 137A, 137N has a communication channel with each of the VMs 132A, 132N and their associated VMM contexts 133A, 133N. When management daemon 137A, 137N receives the new interactivity rate for the trapped VM process, it re-prioritizes the scheduling of this VM process.

In one embodiment, the actual prioritization of VM processes may be done according to any standard process prioritization and scheduling algorithm known to one skilled in the art. The re-prioritization of embodiments of the invention may be accomplished by the management daemon 137A, 137N updating the trapped VM's 132A, 132N interactivity rate and then re-calculating all of the other VM's 132A, 132N prioritization numbers.

For example, in one embodiment, for UNIX and other UNIX-like OSs, the 'nice' program may be used for prioritization and scheduling of the VM processes. The 'nice' program is a mechanism that communicates with a scheduler of the OS and gives the scheduler a number reflecting a priority of the user. In embodiments of the invention, the management daemon 137A, 137N would call 'nice' and give the re-calculated number for the trapped VM process, as well as the other VM's 132A, 132N re-calculated numbers. The scheduler then uses a complex priority algorithm that takes the provided 'nice' number, along with other considerations, in order to schedule the VM processes for use of the host machine 130A, 130N CPU. One skilled in the art will appreciate that other prioritization and scheduling mechanisms may be utilized, and embodiments of the invention are not solely limited to the 'nice' program described above.

Figure 2:
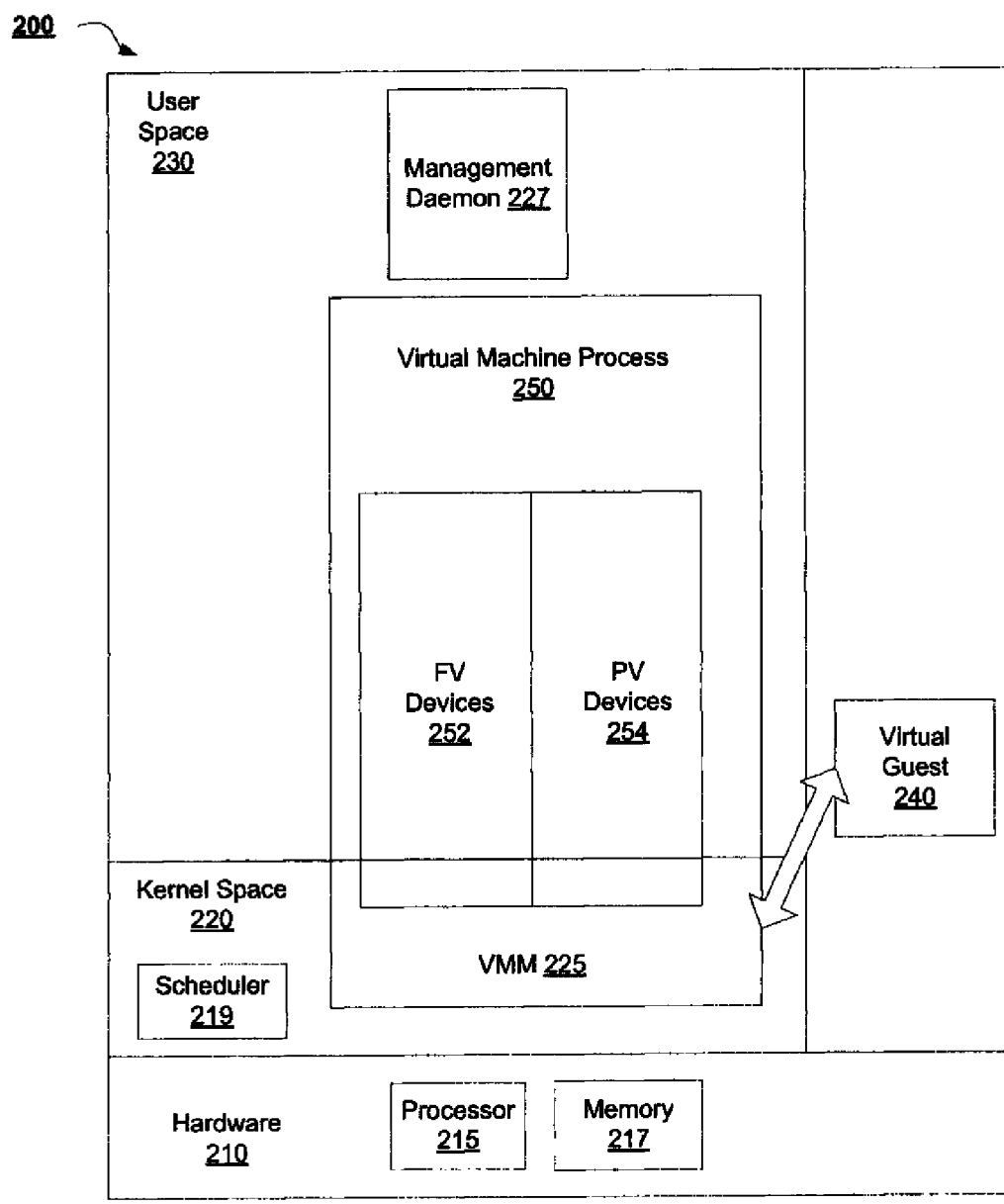
FIG. 2 is a block diagram of a VM host machine hosting a VM that is given prioritized scheduling according to an embodiment of the invention.

FIG. 2 is a block diagram of a host machine 200 hosting a VM guest 240 OS or hosting VM process 250 that is given prioritized scheduling according to an embodiment of the invention. In one embodiment, host machine 200 is the same as host machine 130 described with respect to FIG. 1. Host machine 200 includes a hardware layer 210 containing the physical infrastructure to operate host machine 200, such as processor 215 and a memory 217. In one embodiment, processor 215 may be an Intel™ VT processor or an AMDT™-V processor.

Host machine 200 includes user space 230 and kernel space 220 implemented on top of its hardware layer 210. A VM process 250 associated with VM guest 240 runs utilizing both of the user space 230 and kernel space 220. For instance, a VMM 225 that monitors VM guest 240 runs in the kernel space 220 of host machine 200. VMM 225 may also be referred to as hypervisor, a kernel-based hypervisor (e.g., Kernel-based VM (KVM)), or a host OS. VMM 225 virtualizes the host machine's 200 physical resources 210 for the VM guest 240 and handles some portions of VM process 250. Kernel space also hosts a scheduler 219 used to prioritize the VM process 250 according to embodiments of the invention. User space 230 also is responsible for hosting portions of VM process 250.

Some of the virtual hardware devices utilized by VM guest 240, such as a keyboard, monitor, USB (and some network devices that are not performance sensitive and have a canonical hardware), may be "fully virtualized" (FV) or emulated 252. Some other devices like the network device and block devices (storage) that are performance sensitive may be paravirtualized (PV) 254. These fully virtualized 252 and paravirtualized 254 devices are both executed in the user space 230 and/or the kernel space 220.

In one embodiment, host machine 200 prioritizes VM process 250 with respect to scheduling for CPU resources 215 of the host machine 200 when VM process 250 performs any tasks that are sensitive to end-user noticeable interruption. In one embodiment, this may include tasks such as processes associated with end user inputs to a keyboard or mouse, and processes associated with playback of multimedia files to the end user, including playback of audio files.

In one embodiment, user space 230 includes a management daemon 227 that is responsible for the prioritization of VM process 250. In one embodiment, management daemon 227 is the same as management daemon 137A, 137N described with respect to FIG. 1. As discussed above, hardware devices associated with VM process 250, such as the keyboard, mouse, monitor, and audio device(s) are emulated and fully virtualized or paravirtualized by virtualization components 252, 254. As a result, VMM 225 is fully aware any time that these hardware devices are utilized with respect to VM process 250.

Furthermore, any tasks prioritized by embodiments of the invention will involve these hardware emulations as the virtualized hardware includes the components used to interact with the end user of the VM guest 240. In other embodiments, it is also possible to identify end-user interactive tasks (i.e., prioritization tasks) via particular user inputs that are not necessarily delivered to the VM using hardware emulations.

In embodiments of the invention, when VM 250 performs a task using these hardware emulations, the execution context is caused to switch from the VM guest 240 execution context to the VMM 225 execution context. When such an execution context switch occurs, the VM guest 240 is referred to as a trapped VM and the VM process 250 is referred to as a trapped VM process. The VMM 225 will then determine that a prioritization process is being performed by the trapped VM process 250 and will update an interactivity statistic associated with the trapped VM process 250 according to a emulated hardware type utilized by the trapped VM process 250.

If the interactivity statistic for the VM process 250 changes, then the VMM 225 sends the new interactivity rate for the trapped VM process 250 to the management daemon 227. When management daemon 227 receives the new interactivity rate for the trapped VM process 250, it performs prioritization and scheduling of the VM process 250. In one embodiment, the prioritization involves management daemon 227 updating the trapped VM process' 250 interactivity rate and re-calculating a prioritization number for the VM process 250. The management daemon 227 then provides this prioritization input to a scheduling algorithm of the scheduler 219 of host machine 200. In one exemplary embodiments, based on the prioritization numbers, the scheduler 219 will then schedule interactive VM processes for shorter, but more frequent, processing time slots, while non-interactive VM processes will receive longer and less frequent processing time slots. In some embodiments, it is also possible that the interactivity rate will include a requested duration between two sequential schedulings of VM process 250.

Figure 3:
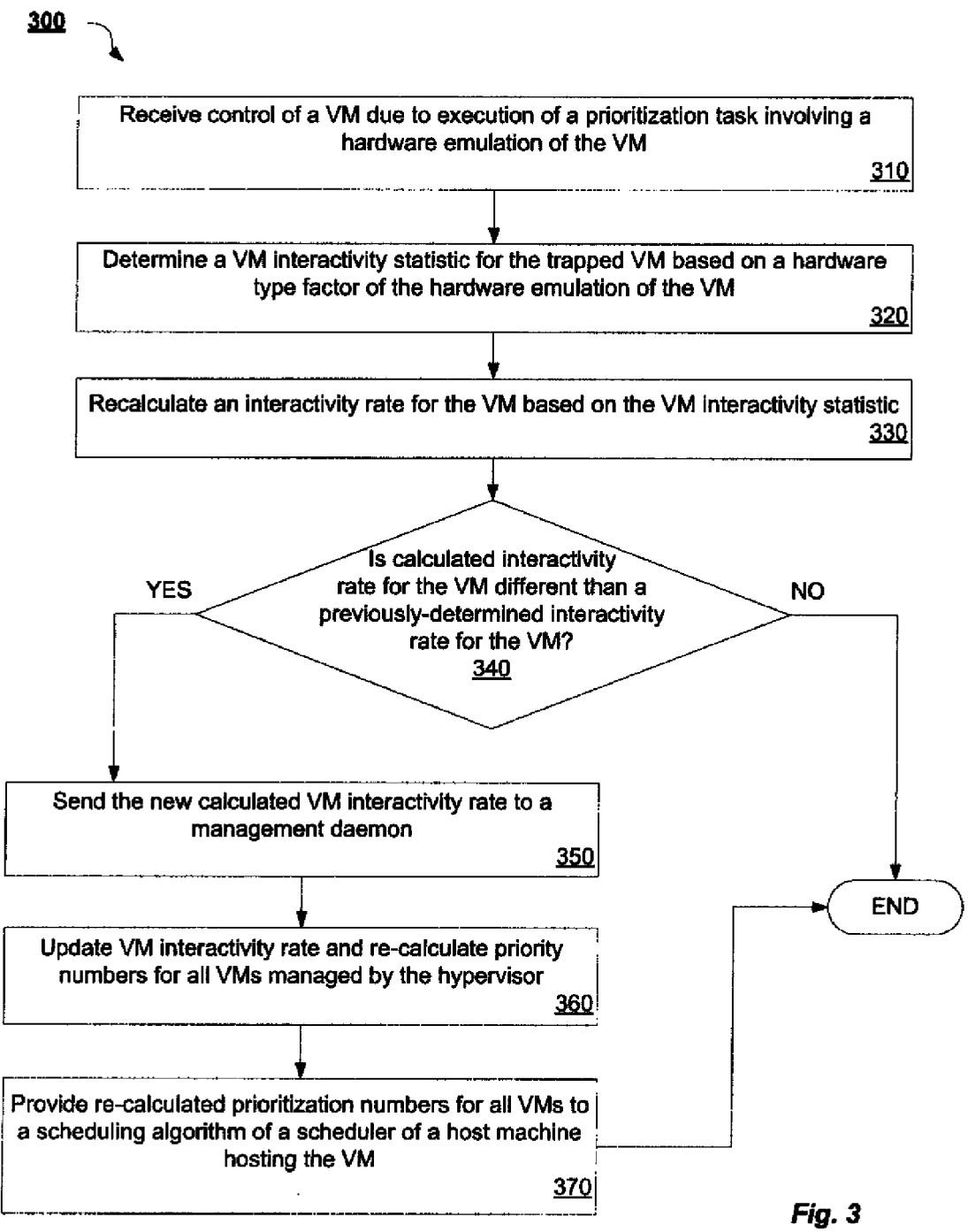
FIG. 3 is a flow diagram illustrating a method for prioritized scheduling of VMs according to an embodiment of the invention.

FIG. 3 is a flow diagram illustrating a method 300 for prioritized scheduling of VMs performed by a VMM according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by VMM 135A, 135N described with respect to FIG. 1.

Method 300 begins at block 310 where a VMM receives control of a VM process due to execution by the VM of a prioritization task involving a hardware emulation of the VM. The VMM receives control via an execution context switch from the VM to the VMM (i.e., trapping the VM) performed by a CPU of a host machine of the VMM. In one embodiment, the prioritization task includes a process associated with an end user providing input to a keyboard, a process associated with the end user providing input to a mouse, a process associated with playback of an audio file, and a process associated with playback of a video file. Embodiments of the invention also encompass other prioritization tasks involving interaction of the end user with any hardware emulation provided by a VM.

Then, at block 320, the VMM determines a VM interactivity statistic for the trapped VM based on a hardware type factor of the hardware emulation of the VM. For instance, a process involving a hardware emulation of an audio device of the VM may have a different interactivity statistic than a hardware emulation of a mouse of the VM, and so on. At block 330, the VMM recalculates an interactivity rate for the trapped VM based on the determined VM interactivity statistic.

Subsequently, at decision block 340, it is determined whether the calculated interactivity rate for the trapped VM is different than a previously-determined interactivity rate for the VM. In some cases, the interactivity rate for a VM will change based on the task being performed by the VM and if such task is utilizing different hardware than a previous task performed by the VM. If the interactivity rate has not changed, then the method 300 ends because the prioritization and scheduling of the VM may be based on previous prioritization and scheduling determinations for the trapped VM. As such, the prioritization and scheduling of the trapped VM does not need to be updated.

If the calculated interactivity rate for the trapped VM has changed at decision block 340, then the VMM sends the newly calculated interactivity rate to a management daemon of the VMM at block 350. The management daemon updates the interactivity rate for the VM and re-calculates prioritization numbers for all VMs managed by the VMM at block 360. Then, at block 370, the management daemon provides the re-calculated prioritization numbers for all of the VMs to a scheduling algorithm of a scheduler in a VM host machine of the VMM. In one embodiment, the scheduling algorithm may be a 'nice' program. The scheduler uses these prioritization numbers to schedule the trapped VM process according to its correct priority. In some embodiments, this results in interactive VM processes being scheduled for shorted and more frequent processing time slots, while non-interactive VM processes are scheduled for longer and less frequent processing time slots.

Figure 4:
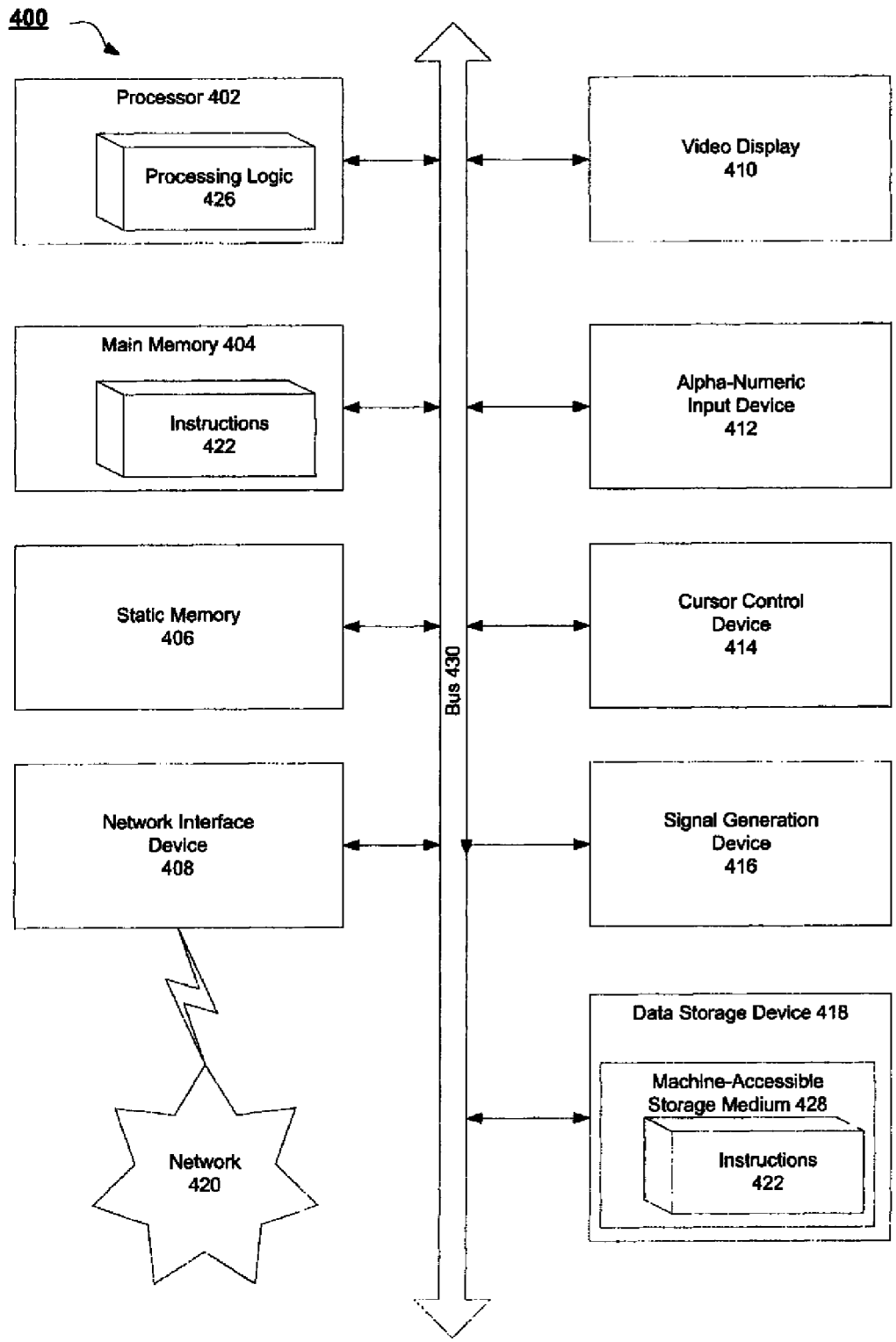
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform method 300 to provide prioritized scheduling of VMs described with respect to FIG. 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
    receiving, by a virtual machine monitor (VMM) of a host machine, control of a virtual machine (VM) executing a task involving a hardware emulation of the VM;
    determining, by the VMM, a statistic assigned to a hardware type factor of the hardware emulation of the VM;
    determining, by the VMM, a rate for the VM to represent interaction of a user with the VM when the VM is executing the task, the rate based on the determined statistic and the task executed by the VM;
    sending, by the VMM, the determined rate for the VM to a management daemon of the VMM if the determined rate for the VM is different than a previous determined rate for the VM;
    re-calculating, by the management daemon, priority numbers for each of the VM and all other VMs managed by the VMM based on the determined rate for the VM; and
    providing, by the management daemon, the re-calculated priority numbers to a scheduling algorithm of a scheduler of the host machine for the scheduler to utilize in prioritizing scheduling of the task of the VM at a resource of the host machine.

2. The method of claim 1, wherein the scheduling algorithm is part of a 'nice' program.

3. The method of claim 1, wherein the scheduling algorithm schedules the VM with short and frequent processing time slots as compared to other VMs that are performing non-interactive tasks.

4. The method of claim 1, wherein the task is at least one of a process associated with input to a keyboard by the user of the VM or a process associated with input to a mouse by the user of the VM.

5. The method of claim 1, wherein the task is a process associated with playback of an audio file to the user of the VM.

6. The method of claim 1, wherein the hardware emulation in the VM is controlled by a quick emulator (qemu) component in the VM.

7. The method of claim 1, wherein the management daemon is responsible for creating the VM and is communicably coupled via a communication channel to the VM.

8. The method of claim 1, wherein the host machine is communicably coupled to a VM host machine controller computing device that provides controlling functions and managers for the host machine.

9. A system, comprising:
    a memory;
    a processing device, communicably coupled to the memory;
    a scheduler, communicably coupled to the memory and the processing device; and
    a virtual machine monitor (VMM) executable from the memory by the processing device, the VMM configured to manage virtual machine (VMs) hosted by the system using a kernel-based virtualization model, the VMM further configured to:
        receive control of a VM of the VMs, the VM executing a task involving a hardware emulation of the VM;
        determine a statistic assigned to a hardware type factor of the hardware emulation of the VM;
        determine a rate for the VM to represent interaction of a user with the VM when the VM is executing the task, the rate based on the determined statistic and the task executed by the VM;
        send the determined rate for the VM to a management daemon of the VMM if the determined rate for the VM is different than a previous determined rate for the VM;
        re-calculate, by the management daemon, priority numbers for each of the VM and all other VMs managed by the VMM based on the determined rate for the VM; and
        provide, by the management daemon, the re-calculated priority numbers to a scheduling algorithm of a scheduler of the host machine for the scheduler to utilize in prioritizing scheduling of the task of the VM at a resource of the host machine.

10. The system of claim 9, wherein the scheduling algorithm is part of a 'nice' program.

11. The system of claim 9, wherein the scheduling algorithm schedules the VM with short and frequent processing time slots as compared to other VMs that are performing non-interactive tasks.

12. The system of claim 9, wherein the task is at least one of a process associated with input to a keyboard by the user of the VM or a process associated with input to a mouse by the user of the VM.

13. The system of claim 9, wherein the task is a process associated with playback of an audio file to the user of the VM.

14. The system of claim 9, wherein the hardware emulation in the VM is controlled by a quick emulator (qemu) component in the VM.

15. The system of claim 9, wherein the management daemon is responsible for creating the VM and is communicably coupled via a communication channel to the VM.

16. A non-transitory machine-readable storage medium including data that, when accessed by a host machine, cause the host machine to perform operations comprising:
   receiving, by a virtual machine monitor (VMM) of the host machine, control of a virtual machine (VM) executing a task involving a hardware emulation of the VM;
   determining, by the VMM, a statistic assigned to a hardware type factor of the hardware emulation of the VM;
   determining, by the VMM, a rate for the VM to represent interaction of a user with the VM when the VM is executing the task, the rate based on the determined statistic and the task executed by the VM;
   sending, by the VMM, the determined rate for the VM to a management daemon of the VMM if the determined rate for the VM is different than a previous determined rate for the VM;
   re-calculating priority numbers for each of the VM and all other VMs managed by the VMM based on the determined rate for the VM; and
   providing the re-calculated priority numbers to a scheduling algorithm of a scheduler of the host machine for the scheduler to utilize in prioritizing scheduling of the task of the VM at a resource of the host machine.

17. The non-transitory machine-readable storage medium of claim 16, wherein the scheduling algorithm is part of a 'nice' program.

18. The non-transitory machine-readable storage medium of claim 16, wherein the task is at least one of a process associated with input to a keyboard by the user of the VM or a process associated with input to a mouse by the user of the VM.

19. The non-transitory machine-readable storage medium of claim 16, wherein the task is a process associated with playback of an audio file to the user of the VM.

20. The non-transitory machine-readable storage medium of claim 16, wherein the hardware emulation in the VM is controlled by a quick emulator (qemu) component in the VM.

* * * * *